US011341139B2

(12) United States Patent
Cialini et al.

(10) Patent No.: US 11,341,139 B2
(45) Date of Patent: *May 24, 2022

(54) INCREMENTAL AND COLLOCATED REDISTRIBUTION FOR EXPANSION OF ONLINE SHARED NOTHING DATABASE

(71) Applicant: International Business Machines Corporation, Armonk, NY (US)

(72) Inventors: Enzo Cialini, Mississauga (CA); Austin Clifford, Dublin (IE); Garrett Fitzsimons, Slane (IE)

(73) Assignee: International Business Machines Corporation, Armonk, NY (US)

( * ) Notice: Subject to any disclaimer, the term of this patent is extended or adjusted under 35 U.S.C. 154(b) by 475 days.

This patent is subject to a terminal disclaimer.

(21) Appl. No.: 16/460,919

(22) Filed: Jul. 2, 2019

(65) Prior Publication Data
US 2019/0377737 A1    Dec. 12, 2019

Related U.S. Application Data

(63) Continuation of application No. 15/100,454, filed as application No. PCT/IB2014/066726 on Dec. 9, 2014, now Pat. No. 10,387,422.

(30) Foreign Application Priority Data

Dec. 13, 2013 (GB) ..................... 1322049

(51) Int. Cl.
*G06F 16/2455* (2019.01)
*G06F 16/22* (2019.01)
(Continued)

(52) U.S. Cl.
CPC .... *G06F 16/24554* (2019.01); *G06F 16/2282* (2019.01); *G06F 16/2365* (2019.01); *G06F 16/24558* (2019.01); *G06F 16/27* (2019.01)

(58) Field of Classification Search
CPC ......... G06F 16/24554; G06F 16/24558; G06F 16/27; G06F 16/2282; G06F 16/2365
(Continued)

(56) References Cited

U.S. PATENT DOCUMENTS 6,625,593 B1    9/2003 Leung et al.
7,103,626 B1 *  9/2006 Recio ................ H04L 29/12207
                                                     709/201
(Continued)

FOREIGN PATENT DOCUMENTS

CN    102521297 A    6/2012
CN    103345519 A    10/2013
(Continued)

OTHER PUBLICATIONS

English Abstract and Machine Translation for CN102521297A, published on Jun. 27, 2012, Total 10 pp.
(Continued)

*Primary Examiner* — Usmaan Saeed
*Assistant Examiner* — Jessica N Le
(74) *Attorney, Agent, or Firm* — Konrad Raynes Davda & Victor LLP; Janaki K. Davda

(57) ABSTRACT

Provided are a system, method and computer program product for redistribution of data in an online shared nothing database, said shared nothing database comprising a plurality of original partitions and at least one new partition. Said method comprising: a collocation-set identifier for identifying two or more collocated tables in the original partitions to be redistributed over the original partitions and at least one new partition, said tables having data rows, each data row residing on a partition governed by a distribution key; a table factory for creating corresponding new tables in the new partition; a view creator for creating a UNION ALL view of all the data from both the original and new tables using the
(Continued)

check constraints, said check constraints in turn based on the distribution keys; a counter for defining a loop of intervals over the distribution key range; a data mover for performing data movement of each data row over the current distribution key interval from the original tables to the new tables; a data changer for altering the check constraints for each distribution key interval so that the UNION ALL view is preserved thereby ensuring collocation and data integrity is maintained; a loop finisher for looping back for the next distribution key interval until all the distribution key intervals have been processed such that all the data has been moved to the new table whereby collocation and data integrity is maintained, redistribution is transparent for queries performed on the database, and tables are fully available during redistribution for read and write.

21 Claims, 14 Drawing Sheets

(51) Int. Cl.
*G06F 16/23* (2019.01)
*G06F 16/27* (2019.01)

(58) Field of Classification Search
USPC .......................................................... 707/690
See application file for complete search history.

(56) References Cited

U.S. PATENT DOCUMENTS

| | | | |
|---|---|---|---|
| 7,792,798 | B2 | 9/2010 | Tremaine et al. |
| 8,041,685 | B2 | 10/2011 | Ito et al. |
| 8,078,825 | B2 | 12/2011 | Oreland et al. |
| 8,949,192 | B2 | 2/2015 | Kaijima et al. |
| 2004/0199533 | A1 | 10/2004 | Celis et al. |
| 2004/0215638 | A1 | 10/2004 | Kapoor et al. |
| 2006/0190243 | A1 | 8/2006 | Barkai et al. |
| 2009/0187612 | A1 | 7/2009 | Kaijima et al. |
| 2009/0216809 | A1 | 8/2009 | Horii et al. |
| 2009/0319581 | A1 | 12/2009 | Seifert |
| 2011/0208719 | A1 | 8/2011 | Betawadkar-Norwood et al. |
| 2011/0289061 | A1 | 11/2011 | Lew et al. |
| 2011/0295907 | A1 | 12/2011 | Hagenbuch et al. |
| 2012/0143823 | A1 | 6/2012 | Jain et al. |
| 2012/0150829 | A1 | 6/2012 | Bourbonnais et al. |
| 2012/0246194 | A1 | 9/2012 | Annapragada |
| 2012/0323852 | A1 | 12/2012 | Jain et al. |
| 2013/0124565 | A1 | 5/2013 | Annapragada |
| 2014/0108459 | A1 | 4/2014 | Gaza et al. |
| 2014/0379692 | A1 | 12/2014 | Teletia et al. |
| 2015/0026158 | A1* | 1/2015 | Jin ............... G06F 16/90335 707/722 |
| 2016/0299952 | A1 | 10/2016 | Cialini et al. |

FOREIGN PATENT DOCUMENTS

| | | |
|---|---|---|
| CN | 103440345 A | 12/2013 |
| JP | 2008533564 | 8/2008 |
| JP | WO2009066691 | 4/2011 |
| JP | 2012123790 | 6/2012 |
| WO | 2009066691 | 5/2009 |

OTHER PUBLICATIONS

English Abstract and Machine Translation for CN103345519A, published on Oct. 9, 2013, Total 24 pp.

English Abstract for CN103440345A, published on Dec. 11, 2013, Total 1 p.

US Publication No. 2006/0190243, dated Aug. 24, 2006, is an English language equivalent of JP2008533564A, dated Aug. 21, 2008.

US Publication No. 2012/0143823, dated Jun. 7, 2012, is an English language equivalent of JP2012123790, dated Jun. 28, 2012.

US Publication No. 2009/0187612, dated Jul. 23, 2009, is an English language equivalent of JPWO2009066691A1, dated Apr. 7, 2011.

U.S. Pat. No. 8,949,192, dated Feb. 3, 2015, is an English language equivalent of JPWO2009066691A1, dated Apr. 7, 2011.

Cohen, J., J. Eshleman, B. Hagenbuch, J. Kent, C. Pedrotti, G. Sherry, and F. Waas, "Online Expansion of Large-scale Data Warehouses", Proceedings of the VLDB Endowment, vol. 4, No. 12, © 2011 VLDB Endowment. Retrieved from the Internet at <URL: http://www.vldb.org/pvldb/vol4/p1249-cohen.pdf>, Total 11 pp.

Meyer, G., D. Kuntze, T. Bollinger, and S. Laudien, "Best Practices: Query Optimization in a Data Warehouse", IBM Data Warehousing Center of Excellence, Published: Jun. 2011. Retrieved from the Internet at <URL: https://www.ibm.com/developerworks/community/wikis/form/anonymous/api/wiki/0fc2f498-7b3e-4285-8881-2b6c0490ceb9/page/65d8bfda-22bc-4f7e-b26f-c1503ae355d6/attachment/2b5adfff-e87f-45e8-ba1a-f021654f250a/media/ISASBP_Query_Optimization_0611.pdf>, Total 52 pp.

International Search Report and Written Opinion, dated Mar. 27, 2015, for International Application No. PCT/IB2014/066726, Total 11 pp.

GB Search Report, dated May 25, 2014, for Application No. GB 1322049.6, Total 4 pp.

CN Office Action, Oct. 8, 2018, for Application No. GB20130131CN1, Total 5 pp. (with cited references listed on page 4).

Information Materials for IDS, dated Jun. 8, 2018, attached to JP Office Action GB920130131JP1, dated May 29, 2018, Total 3 pp.

Preliminary Amendment for U.S. Appl. No. 15/100,454, 9 pp., dated May 31, 2016. [57.396 (PrelimAmend)].

Office Action 1 for U.S. Appl. No. 15/100,454, 23 pp., dated Sep. 25, 2018. [57.396 (OA1)].

Response to Office Action 1 for U.S. Appl. No. 15/100,454, 16 pp., dated Jan. 15, 2019. [57.396 (ROA1)].

Notice of Allowance 1 for U.S. Appl. No. 15/100,454, 30 pp., dated Apr. 3, 2019. [57.396 (NOA1)].

List of IBM Patents or Patent Applications Treated as Related, dated Jul. 2, 2019, 2 pp. [57.396C1 (Appendix P)].

US Publication No. 2012/0323852, dated Dec. 20, 2012, is an English language equivalent of JP2012123790, dated Jun. 28, 2012. GB920130131US02, filed Jul. 2, 2019.

GB920130131US1, filed May 31, 2016, U.S. Appl. No. 15/100,454, 2016-0299952.

* cited by examiner

Shard Redistribution Module 400A

- Original Partition Register 402
- New Partition Register 404
- Collocation Set Register 406
- Corresponding Collocation Table Register 408
- Distribution Key Register 410
- UNION ALL View Register 412
- Check Constraints Register 414
- Redistribution Method 500
  - Steps 501 to 507
    - Steps 507a to 507r
      - Steps 507m1 to 507m9

FIGURE 4

Redistribution Method 500

- 501 Obtain specification of sets of collocated tables
- 502 Create new partition group over all partitions
- 503 Construct target partition map
- 504 Extract data definition of all table objects
- 505 Modify data definition for new partition group
- 506 Create duplicate tablespaces
- 507 Redistribute data for each collocation set
- 508 Remaining collection sets and non-collocated tables
  - Yes → return to 507
  - No → continue
- 509 Drop original tablespaces and objects
- 510 Drop original partition group and objects
- 511 End

FIGURE 5A

Sub-Method 507a to 507r

507a Remove permissions on underlying tables

507b Unmaterialize any associated query tables

507c Rename all tables in the collocation set

507d Create matching new tables

507e Add an inflight column

507f Alter check constraints on distribution key

507g Create a UNION ALL view

507h Re-materialize any associated query tables

507i Invalidate all packages that involve this table

507j Determine the columns in the distribution key

Next step 507k

FIGURE 5B

Sub-Method 507

( Previous step 507j )

507k Determine low & high value of the distribution key

507l Define iterative loop with of order 100 intervals over distribution range

507m Move data

507n Un-materialize associated query tables

507o Drop associated Union ALL view

507p Drop inflight column from each table

507q Re-materialize associated query tables

507r Invalidate all packages that involve this table

FIGURE 5C

|  | Interval | | | |
|---|---|---|---|---|
|  | 1 | 2 | 34 | 60 |
| Data | 2.5million | 3.7million | 1.2million | 0 |
| Distribution Key | 1million | 2million | 34million | 60million |

FIGURE 8A

|  | Interval | | | |
|---|---|---|---|---|
|  | 1 | 2 | 34 | 60 |
| Data | 2million | 2million | 2million | 2million |
| Distribution Key | 1million | 1.5million | 30.8million | 40.6million |

FIGURE 8B

INCREMENTAL AND COLLOCATED REDISTRIBUTION FOR EXPANSION OF ONLINE SHARED NOTHING DATABASE

FIELD OF THE INVENTION

This invention relates to a method and apparatus for incremental and collocated redistribution for expansion of an online shared nothing database.

BACKGROUND

In a shared nothing database (SN), data is divided into partitions (also known as shards) and placed over one or more nodes or individual machines which have local disk storage, memory and central processing unit (CPU). The partitions, nodes and machines are connected to each other through a high speed interconnect through which all database interpartition communication is facilitated. Each partition has no direct access to data on other partitions and nodes, other than through the high speed interconnect. Typically there are a fixed number of partitions per node automatically configured as defined by a configuration file.

An SN database manager allows great flexibility in spreading data across multiple database partitions of a partitioned database. Users can choose how to distribute their data by declaring distribution keys, and can determine which and how many database partitions their table data can be spread across by selecting the database partition group and table space in which the data is to be stored. In addition, a distribution map (which is updateable) specifies the mapping of hashed distribution key values to database partitions. This makes it possible for flexible workload parallelization across a partitioned database for large tables, while allowing smaller tables to be stored on one or a small number of database partitions if the application designer so chooses.

In a partitioned database, the distribution key is used to distribute table and index data across a set of database partitions. The distribution key for a table in a table space on a partitioned database partition group is specified in a CREATE TABLE statement or an ALTER TABLE statement. Rows are placed in a database partition as follows: a hashing algorithm (database partitioning function) is applied to all of the columns of the distribution key, which results in the generation of a distribution map index value; and the database partition number at that index value in the distribution map identifies the database partition in which the row is to be stored.

Referring to an example distribution map and distribution key in FIG. 1, a distribution key is the contents of one or more columns for a row of data (c1 and c3 in the example) that map onto a partition in the distribution map (p5 in the example), which is identified through the distribution map index by the hashed distribution key value 2.

The database manager supports partial de-clustering, which means that a table can be distributed across a subset of database partitions in the system (that is, a database partition group). Tables do not have to be distributed across all of the database partitions in the system. The database manager has the capability of recognizing when data being accessed for a join or a sub-query is located at the same database partition in the same database partition group. This is known as table collocation. Rows in collocated tables with the same distribution key values are located on the same database partition. The database manager can choose to perform join or sub-query processing at the database partition in which the data is stored. This has very significant performance advantages.

Collocated tables must: be in the same database partition group and have the same distribution map; have distribution keys with the same number of columns; have the corresponding columns of the distribution key be database partition-compatible (compatible data types for example); and be in a single partition database partition group defined on the same database partitions.

In a data warehouse, the fact table and its largest dimension table are typically collocated. For example, FIG. 2 depicts a join of the two largest tables in a well-known bench marking workload. In this example, an ORDERS table (a dimension table) and a LINEITEM table (a fact table) are both distributed on an orderkey column and a join operation across these two tables is processed locally on each partition of the containing partition group, resulting in a significant performance saving.

The challenge is to maintain performance while expanding a SN partitioned database through the addition of new nodes. When a partitioned database is expanded to include newly provisioned nodes and partitions, the partition groups must be expanded to include the newly provisioned partitions. To maintain a balanced allocation of data for each table across the expanded system, and to allow for future growth on the existing partitions, the data must be redistributed across the system. The redistribution process involves the allocation of a partition group which spans all partitions in the expanded system and then reassignment of each table row in the partition group based on the new partition map. This process can take a significant amount of time, for example, reassigning tens or hundreds of terabytes of data can take several days. Typically, this process is performed as an offline activity and can require several days outage.

One of the main difficulties during the redistribution process is that collocation is not maintained during the operation. As the tables in the partition group are redistributed in sequence one at a time, the partition maps of joined tables will differ until all such joined tables in the partition group have been redistributed. Another challenge is the ability to incrementally redistribute each table and the row data therein, to the new database map, transparently to the end user while maintaining full access to the data and without incurring the need for two copies of the data being moved (existing and new).

There exists in the prior art techniques for the online moving of tables to a new partition group/map. For instance, US20090319581A1 discloses a method for online movement of a table requiring two copies of the table being moved but does not maintain collocation between tables during the move.

Another existing patent publication US20110295907A1 discloses an apparatus and method for expanding a SN database and a technique for redistributing a SN database while minimizing downtime, however, this method does not provide for preservation of collocation or full availability of data and requires two copies of the data.

Another existing patent publication US20120246194A1 provides a method for maintaining collocation through placing data with a previously encountered distribution key in the same database partition, and placing data for distribution keys not previously encountered in a new database partition. In other words, this method attempts to dispense entirely with data redistribution. However, this approach effectively can result in permanently unbalanced partition groups (as only data for new distribution keys are placed on new partitions), invariably leading to performance and tuning problems, and can result in critical scenarios where the existing nodes exhaust available storage, especially in homogenous appliance based clusters.

BRIEF SUMMARY OF THE INVENTION

In a first aspect of the invention there is provided a system for redistribution of data in an online shared nothing database, said shared nothing database comprising a plurality of original partitions and at least one new partition, said method comprising: a collocation set identifier for identifying two or more collocated tables in the original partitions to be redistributed over the original partitions and at least one new partition, said tables having data rows, each data row residing on a partition governed by a distribution key; a table factory for creating corresponding new tables in the new partition; a view creator for creating a UNION ALL view of all the data from both the original and new tables using the check constraints, said check constraints in turn based on the distribution keys; a counter for defining a loop of intervals over the distribution key range; a data mover for performing data movement of each data row over the current distribution key interval from the original tables to the new tables; a data changer for altering the check constraints for each distribution key interval so that the UNION ALL view is preserved thereby ensuring collocation and data integrity is maintained; a loop finisher for looping back for the next distribution key interval until all the distribution key intervals have been processed such that all the data has been moved to the new table whereby collocation and data integrity is maintained, redistribution is transparent for queries performed on the database, and tables are fully available during redistribution for read and write.

Redistribution occurs whilst the shared nothing database is online; that is the shared nothing data is fully available for read and write by any connected external entity.

In a second aspect of the invention there is provided a method for redistribution of data in an online shared nothing database, said shared nothing database comprising a plurality of original partitions and at least one new partition, said method comprising: identifying two or more collocated tables in the original partitions to be redistributed over the original partitions and the at least one new partition, said tables having data rows, each data row residing on a partition governed by a distribution key; creating corresponding new tables in the new partition; creating a UNION ALL view of all the data from both the original and new tables using the check constraints, said check constraints in turn based on the distribution keys; defining a loop of intervals over the distribution key range; performing data movement of each data row over the current distribution key interval from the original tables to the new tables; altering the check constraints for each distribution key interval so that the UNION ALL view is preserved thereby ensuring collocation and data integrity is maintained; looping back for the next distribution key interval until all the distribution key intervals have been processed such that all the data has been moved to the new table whereby collocation and data integrity is maintained, redistribution is transparent for queries performed on the database, and tables are fully available during redistribution for read and write.

The embodiments ensure that query performance is maintained during redistribution.

Advantageously data is relocated between the original tables and new tables by using a row movement feature of the UNION ALL view.

More advantageously updating an indicator column for a given row in the current interval will initiate the row movement feature and move the row from the original table into the new table.

Even more advantageously creating a new partition group spanning existing partitions and the new partitions, with an associated new partition map where individual partitions are defined either a sender or a receiver of the data being moved. A partition is never a sender and receiver of the data at the same time and this reduces the amount of network traffic during the redistribution.

Still more advantageously the new partition group is created by: extracting data definition of existing partition group; modifying the data definition to incorporate the new partitions; executing the modified data definition.

Preferably two or more sets of collocated tables are located on two or more partitions within the existing partition group. Tables in the partition group being redistributed are classified as belonging to a "collocation set". A collocation set is a group of collocated tables, that is, tables which participate in collocated joins.

More preferably each interval is small relative to the entire table (typically of order 1%) in order to minimize any impact of inflight data on performance.

Still more preferably rows are moved from the original tables to the new tables incrementally and committed in batches. Commit size is kept small relative to the entire interval (typically of order of 10,000 rows) such that incremental movement minimizes locking and maintains full availability of the tables for query and other user data manipulation language (DML) operations.

Yet more preferably new rows inserted for the current distribution key interval are diverted to the new table. This is performed since no value is supplied for the indicator column (also known as the inflight indicator) and there is no need for a second pass of the rows in the interval.

Alternatively the intervals could be weighted using statistical data redistribution from the database catalog, such that all intervals contain approximately the same volume of data. See FIG. 8B for a depiction of this alternative embodiment.

A method as previously described wherein performance data (for later analysis) is stored after moving a row.

The indicator column is added to both the original and new tables as a nullable column, initially with a default value of Y on the existing table and NULL on the target table. This is a hidden column which is not visible to the user. Importantly, no structural change nor data update is actually made to the tables for a nullable column and it is therefore an instantaneous operation with no requirement for additional storage. A database management system (DBMS) simply returns the default value (or null if not set) when this indicator column is queried.

Upon the completion of each interval, the range of distribution key values is consistent between the original and new version of the tables, so that collocated joins are achieved between the original tables and also between the new tables.

After each interval, an existing DBMS online reorganization utility is executed to reclaim disk storage for the rows deleted from the original table during the interval.

After the final distribution key interval has been processed, the UNION ALL view and the now empty original tables are dropped and the new table is renamed as the original name, for each table in the collocation set. In this fashion, all collocation sets in the partition group are successively redistributed. Any tables which are stand alone and which are not collocated are then redistributed in a similar fashion but without the need to maintain collocation.

Finally, the original partition group and associated partition map is removed from the database catalog. At this point the online redistribution is complete and the data is evenly and uniformly balanced across all database partitions.

A new partition is a new database partition also known as shard or horizontal partitioning. A new table is created for each original table, with the new partition map in the new expanded partition group. The UNION ALL view is created over each of the original and new tables to present the data residing in the tables as a single entity for the duration of the redistribute operation. A check constraint on the distribution key column is applied to the original and new tables. Initially the check constraint enforces that all rows are located in the original table. The range of values over which the distribution key spans is subdivided into a fixed number of intervals of ascending values. Iteratively, the rows for each interval are moved for each table in the collocation set from the associated original table to the associated new table. The check constraints are altered for each interval to reflect the new location of the data for the associated distribution key range.

A UNION ALL view is a special form of view which allows data from multiple tables to be presented to the end-user as if the data resided in a single table. The UNION ALL view is not a physical materialization of the data, rather it is purely a mechanism for routing a query over the view to the underlying table. There can be two or more underlying tables. If a UNION ALL view V1 which is comprised of a SELECT over tables T1 and T2, is joined to another UNION ALL view V2 which is comprised of SELECTS over tables T3 and T4, and if T1 and T3 are collocated and T2 and T4 are also collocated, and there is a check constraint or predicate in the view which constrains the distribution key to the same range on the collocated tables (T1&T3 and T2&T4), then a DBMS optimizer will rewrite the join of V1 to V2 as the collocated join of T1 to T3 unioned with the collocated join of T2 and T4. In other words, if two view V1 and V2 are created as follows:

CREATE VIEW V1 as SELECT*FROM T1 UNION ALL SELECT*FROM T2 WITH ROW MOVEMENT
CREATE VIEW V2 as SELECT*FROM T3 UNION ALL SELECT*FROM T4 WITH ROW MOVEMENT
Then, SELECT*FROM V1 JOIN V2 ON V1.keycol=V2.keycol is rewritten by the optimizer as:
SELECT*FROM T1 JOIN T3 ON T1.keycol=T3.keycol UNION ALL SELECT*FROM T2 JOIN T4 ON T2.keycol=T4.keycol Importantly, the tables comprising a UNION ALL view can be placed in different partition groups or have different partition maps.

The optimizer relies on "check constraints" to resolve which table contains the row matching the supplied predicates. The check constraint for each constituent table of the UNION ALL view are enforced constraints which are non-overlapping and uniquely define into which table to apply a DML operation (for instance SELECT, INSERT, UPDATE or DELETE). The ROW MOVEMENT clause indicates that any rows which are changed such that the check constraint is violated are automatically moved to the other table in the view.

The embodiments improve the quality and efficiency of database processes carried on outside the SN database since the redistribution operates within the SN database and is not visible to the database process that use the SN database.

The embodiments have an effect that operates at a system level of a computer system that is transparent and below an overlying application level.

The embodiments have an effect that results in the SN database redistribution being made to operate in real time and therefore in a new way.

The embodiments have an effect leading to an increase in the speed or reliability of the SN database.

In a third aspect of the invention there is provided a computer program product for online redistribution of data in a shared nothing database, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal carrying media.

BRIEF DESCRIPTION OF THE DRAWINGS

Preferred embodiments of the present invention will now be described, by way of example only, with reference to the following drawings in which:

FIG. 4 is a schematic component diagram of the preferred embodiment;

FIG. 5A to 5D are flow diagrams of preferred embodiment methods;

FIGS. 8A and 8B compares two types of interval distribution for the preferred embodiment and an alternative embodiment respectively.

DETAILED DESCRIPTION OF THE EMBODIMENTS

Figure 1:
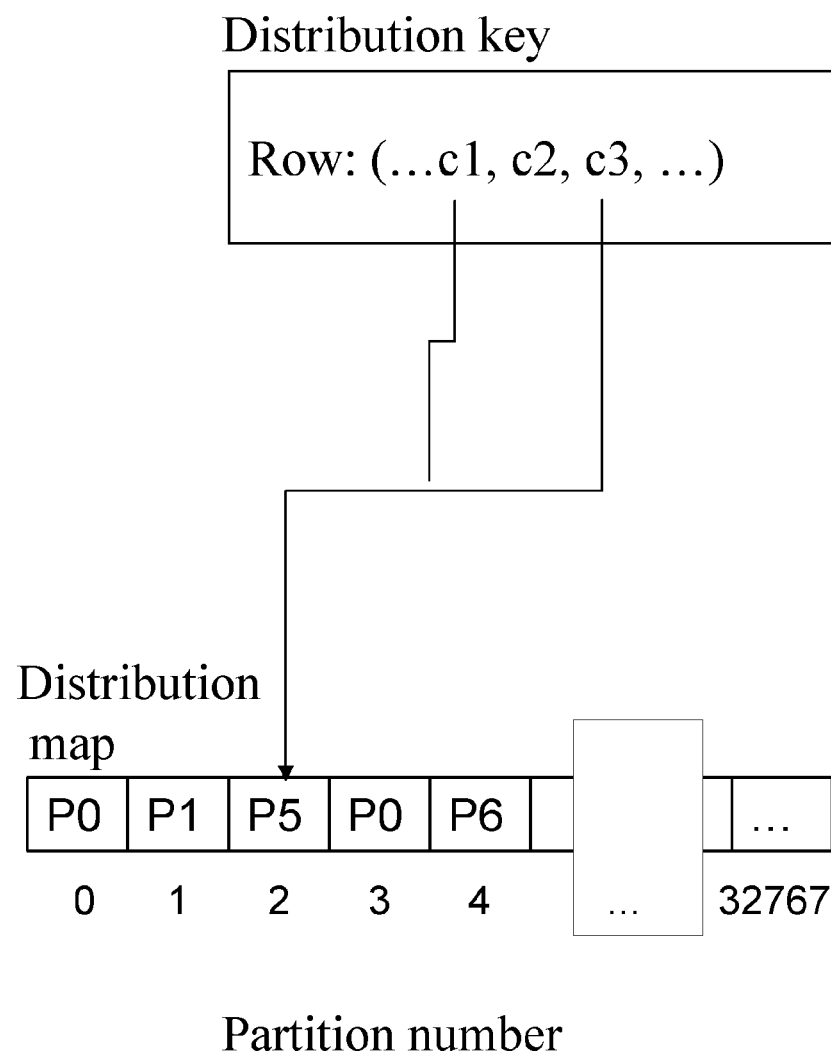
FIG. 1 is a relationship diagram of an example distribution map and key of an existing shared nothing database.
Figure 2:
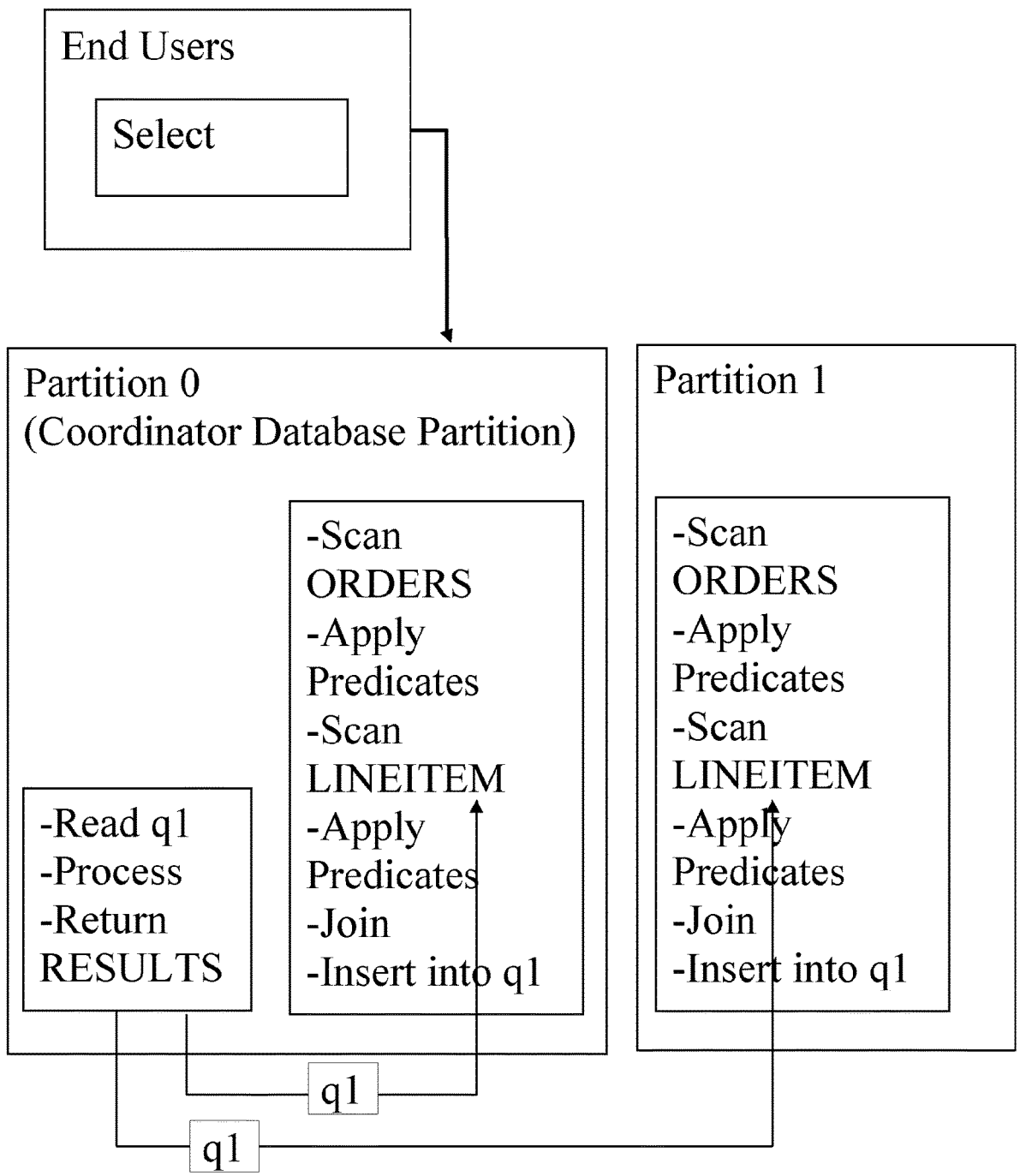
FIG. 2 is a diagram of the two largest tables in a well-known bench marking workload.
Figure 3:
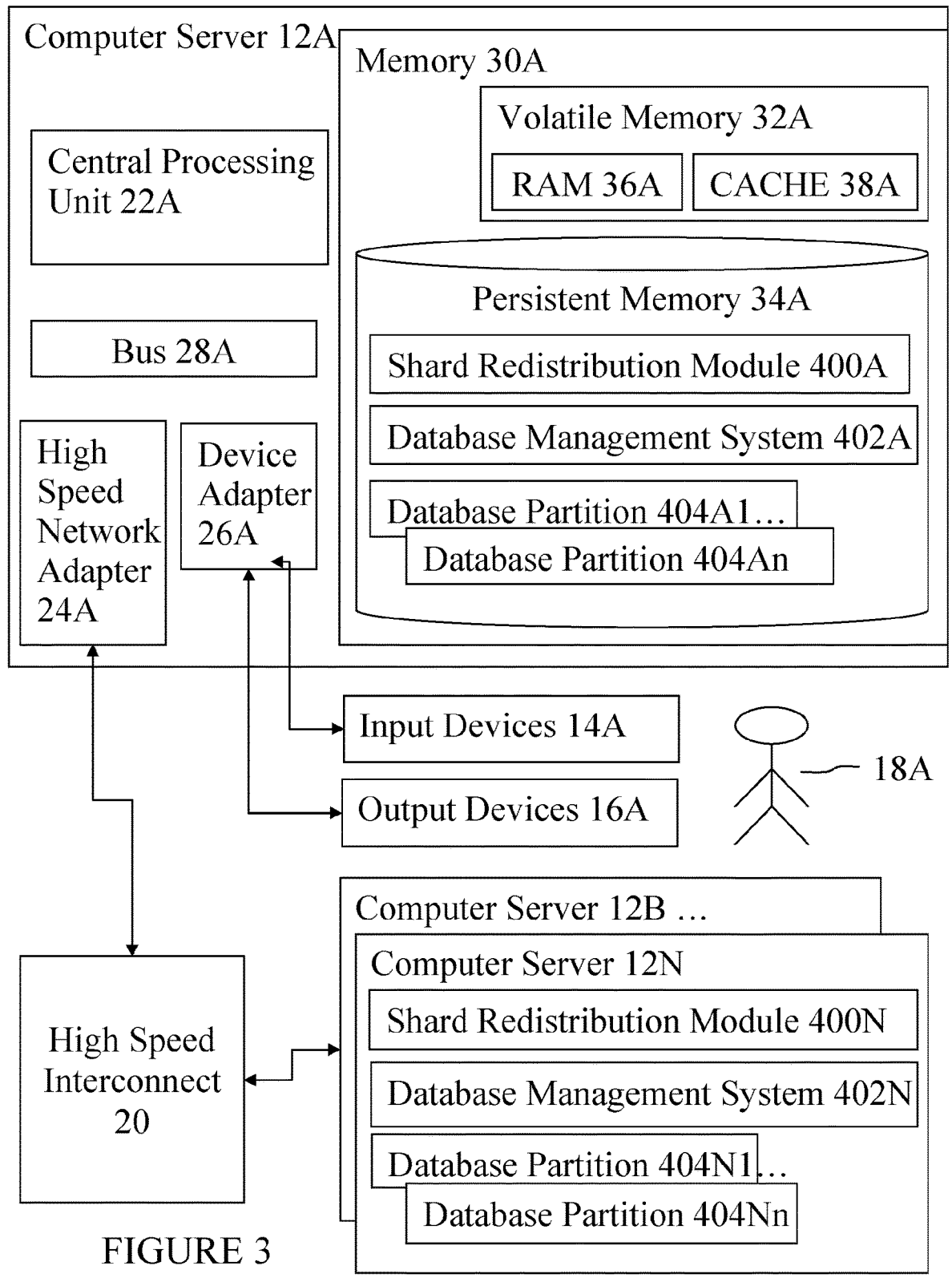
FIG. 3 is a schematic deployment diagram of the preferred embodiment.

Referring to FIG. 3, the deployment of a preferred embodiment in shared nothing database 10 is described. Shared nothing database 10 is operational with numerous other general purpose or special purpose computing system environments or configurations. Examples of well-known computing processing systems, environments, and/or configurations that may be suitable for use with shared nothing database 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices.

Shared nothing database 10 may be described in the general context of computer system-executable instructions, such as program modules, being executed by a computer processor. Generally, program modules may include routines, programs, objects, components, logic, and data structures that perform particular tasks or implement particular abstract data types. Shared nothing database 10 may be embodied in distributed cloud computing environments where tasks are performed by remote processing devices that are linked through a communications network. In a distributed cloud computing environment, program modules may be located in both local and remote computer system storage media including memory storage devices.

Shared nothing database 10 of the preferred embodiment comprises: a plurality of general-purpose computer servers 12A to 12N, one or more input devices 14A and output devices 16A directly attached to the computer server 12A and high speed interconnect 20. Shared nothing database 10 communicates with a user 18A using input devices 14A and output devices 16A. Input devices 14A include one or more of: a keyboard, a scanner, a mouse, trackball or another pointing device. Output devices 16A include one or more of a display or a printer.

Computer server 12A is described in more detail and such detail also applies with corresponding changes to computer servers 12B to 12N. Computer servers 12B to 12N therefore comprise similar components to 12A but are shown only with key embodiment components.

Computer server 12A comprises: central processing unit (CPU) 22A; high speed network adapter 24A; device adapter 26A; bus 28A and memory 30A.

CPU 22A loads machine instructions from memory 30A and performs machine operations in response to the instructions. Such machine operations include: incrementing or decrementing a value in register (not shown); transferring a value from memory 30A to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run or alternatively interpreted in terms of machine instructions.

High speed network adapter 24A is connected to bus 28A and high speed interconnect 20 for enabling communication between the computer server 12A and computer servers 12B to 12N.

Device adapter 26A is connected to bus 28A and input devices 14A and output devices 16A for enabling communication between computer server 12A and input devices 14A and output devices 16A.

Bus 28A couples the main system components together including memory 30A to CPU 22A. Bus 28A represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30A includes computer system readable media in the form of volatile memory 32A and non-volatile or persistent memory 34A. Examples of volatile memory 32A are random access memory (RAM) 36A and cache memory 38A. Generally volatile memory is used because it is faster and generally non-volatile memory is used because it will hold the data for longer. Shared nothing database 10 may further include other removable and/or non-removable, volatile and/or non-volatile computer system storage media. By way of example only, persistent memory 34A can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28A by one or more data media interfaces. As will be further depicted and described below, memory 30A may include at least one program product having a set (for example, at least one) of program modules that are configured to carry out the functions of embodiments of the invention.

The set of program modules configured to carry out the functions of the preferred embodiment comprises shard redistribution module 400A, database management system 402A, and database partitions 404A1 to 404An. Further program modules that support the preferred embodiment but are not shown include firmware, boot strap program, operating system, and support applications. Each of the operating system, support applications, other program modules, and program data or some combination thereof, may include an implementation of a networking environment.

Corresponding program modules are shown for computer server 12N comprising: shard redistribution module 400N; database management system 402N; and database partitions 404N1 to 404Nn.

Corresponding program modules are implied (but not shown) for computer server 12B to 12N.

Shared nothing database 10 communicates over the high speed interconnect 20. Network adapter 24A communicates with the other components of computer server 12A including database partitions via bus 28A performing as fast or faster than the high speed interconnect.

Database management system (DBMS) 402A is a standard shared nothing database management system.

Database partitions 404A1 to 404An are created in persistent memory and disk 34A. Partitions can be removed or added.

Referring to FIG. 4, shard redistribution module 400A comprises the following components: original partition register 402; new partition register 404; collocation set register 406; corresponding collocated table register 408; distributed key register 410; UNION ALL register 412; check constraints register 414; and redistribution method 500.

Original partition register 402 is for storing the location of the original partition.

New partition register 404 is for storing the location of the new partition.

Collocation set register 406 is for storing the location of the collocation sets. Corresponding collocation table register 408 is for storing the located of the corresponding collocated tables.

Distributed key register 410 is for storing the range and interval of the distributed key.

UNION ALL register 412 is for storing the parameters of the UNION ALL view.

Check constraints register 414 are for storing the check constraints.

Figure 5D:
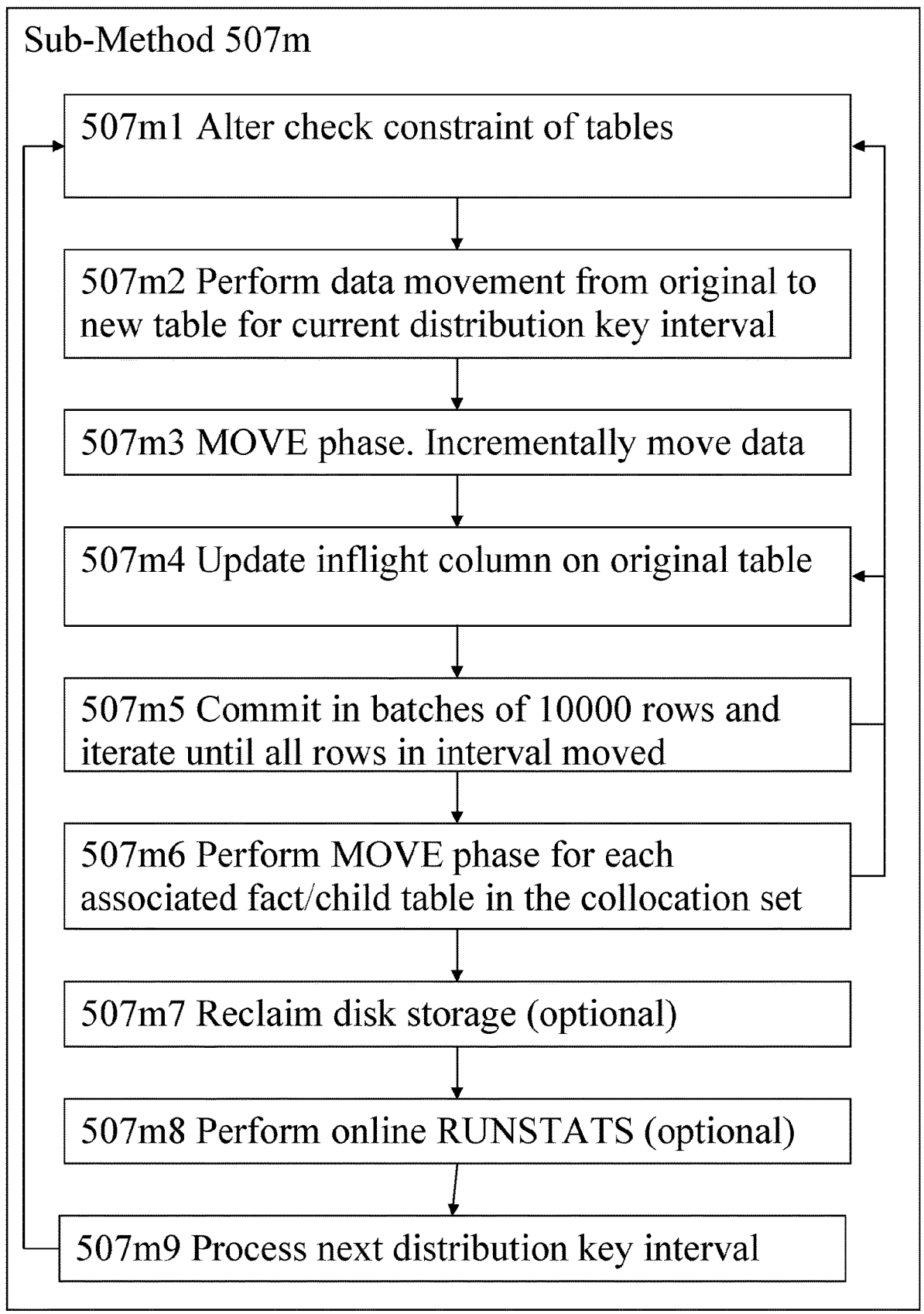

Redistribution method 500 comprises logical process steps 501 to 510 (see FIG. 5A). Step 507 calls logical process steps 507a to 507r (see FIG. 5B to 5C). Step 507m calls logical process steps 507m1 to 507m9 (see FIG. 5D).

Referring to FIG. 5A, logical process steps 501 to 510 are described.

Step 501 is for obtaining a specification of a set of collocated tables from the user (for example in XML file format). Example ORDERS and LINEITEM tables form a standard schema form a simple example collation set for the method.

Step 502 is for creating a new partition group spanning all partitions in the expanded database.

Step 503 is for constructing a target partition map such that partitions are either senders or receivers of the data being redistributed (never both) and assign the map to the new partition group.

Step 504 is for extracting the data definition (in data definition language (DDL)) of all table spaces, tables and dependent objects (materialized views, views, foreign key constraints for example) from the existing partition group being redistributed.

Step 505 is for modifying the extracted data definition to adjust the tablespace definitions to reference the new expanded partition group and assign new names, and similarly adjust other associated objects to reference the new tablespace names etc.

Step 506 is for executing the adjusted data definition to create the duplicate table spaces in the new database partition group.

Step 507 is for redistributing the data for every table in the database partition group, processing tables in the same collocation set concurrently. Sub method steps 507a to 507r are described in FIGS. 5B and 5C.

Step 508 is for repeating step 507 for each collocation set and any remaining non-collocated tables.

Step 509 is for dropping the existing tablespace and objects therein.

Step 510 is for dropping the existing partition group.

Referring to FIG. 5B to 5C, sub method step 507 comprises logical process steps 507a to 507r.

Step 507a is for removing permissions on the underlying tables in the collocation set.

Step 507b is for unmaterializing any associated materialized query tables (MQTs), in other words temporarily converting these MQTs to regular tables (this is an instant operation).

Step 507c is for renaming all tables in the collocation set to <original_table_name>_O where _O signifies _Original and optionally, adding a unique system time and random suffix to guarantee the table name is unique.

Step 507d is for using the data definition extracted in step 504, creating a matching new table for each table in the collocation set in the new partition group with name <original_table_name>_N where _N signifies _New.

Step 507e is for altering the original and new tables to add a hidden INFLIGHT column with default value Y on the original table and NULL on the new table.

Step 507f is for altering the check constraints on the distribution key on the original and new tables such that all data manipulation language operation (INSERT, DELETE, UPDATE, SELECT) are directed to the appropriate table (initially all to the original table).

Step 507g is for creating a UNION ALL view for each table in the collocation set as SELECT*FROM<original_table_name>_O UNION ALL SELECT*FROM <original_table_name>_N WITH ROW MOVEMENT.

Step 507h is for rematerializing any associated MQTs against the new UNION ALL view. Where the MQT is in the current collocation set, convert it to a user maintained MQT so that it too can be redistributed (this is an instant operation).

Step 507i is for invalidating all packages that involve this table to force the compiler to obtain the new table information and generate packages accordingly Step 507j is for determining the columns in the distribution key.

Step 507k is for determining the low and high value of the distribution key from the parent/dimension table in the collocation set. For a compound distribution key, select the constituent column with the highest cardinality (number of distinct values).

Step 507l is for initializing an iterative loop with of order 100 steps/intervals over the distribution key range.

Step 507m is for moving the data is described in relation to FIG. 5D. Step 507n is for unmaterializing any associated MQTs.

Step 507o is for dropping the associated UNION ALL view and renaming the associated new table to the original table name (that is remove the _N suffix) for each table in the collocation set.

Step 507p is for dropping the inflight column from each table (again, no structural change is effected and this operation is instant).

Step 507q is for rematerializing any associated MQTs against the renamed new table.

Step 507r is for invalidating all packages that involve this table, to force the compiler to obtain the new table information and generate packages accordingly.

Referring to FIG. 5D, sub method step 507m comprises logical process steps 507m1 to 507m9 performed for each interval.

Step 507m1 is for altering the check constraint of the original (<tablename>_O), and new tables (<tablename>_N) to effect movement (using the INFLIGHT column) of that data interval.

Step 507m2 is for performing the data movement for the current distribution key interval from the original table to the new table.

Step 507m3 is for incrementally moving data from the parent/dimension table in the collocation set to the new table (<tablename>_N) by updating the indicator column . . . .

Step 507m4 is for updating the inflight indicator column on the original table. For example using database commands such as UPDATE<table_name>SET inflight=NULL WHERE<distributionkey>BETWEEN m and m+n//(where n achieves the desired number of rows for example 10,000 and m is the counter).

Step 507m5 is for committing data in batches of order 10,000 rows (for example) and for looping back to step 507m4 until all rows have been moved from original to the new table.

Step 507m6 is for performing equivalent MOVE phases to move each associated fact/child table(s) in the collocation set for the current distribution key interval to the new table.

Step 507m7 is for, optionally, reclaiming disk storage. For instance, by performing an online REORG operation on the original version of each of the tables in the collocation set to reclaim the disk storage for the deleted rows.

Step 507m8 is for, optionally, acquiring performance statistics on the movement. For instance, by performing an online RUNSTATS operation on the new and original versions of each of the tables in collocation set or alternatively, by copying and interpolating the statistics from the original table.

Step 507m9 is for processing the next interval at step 507m1 until all intervals have been processed.

Figure 6:
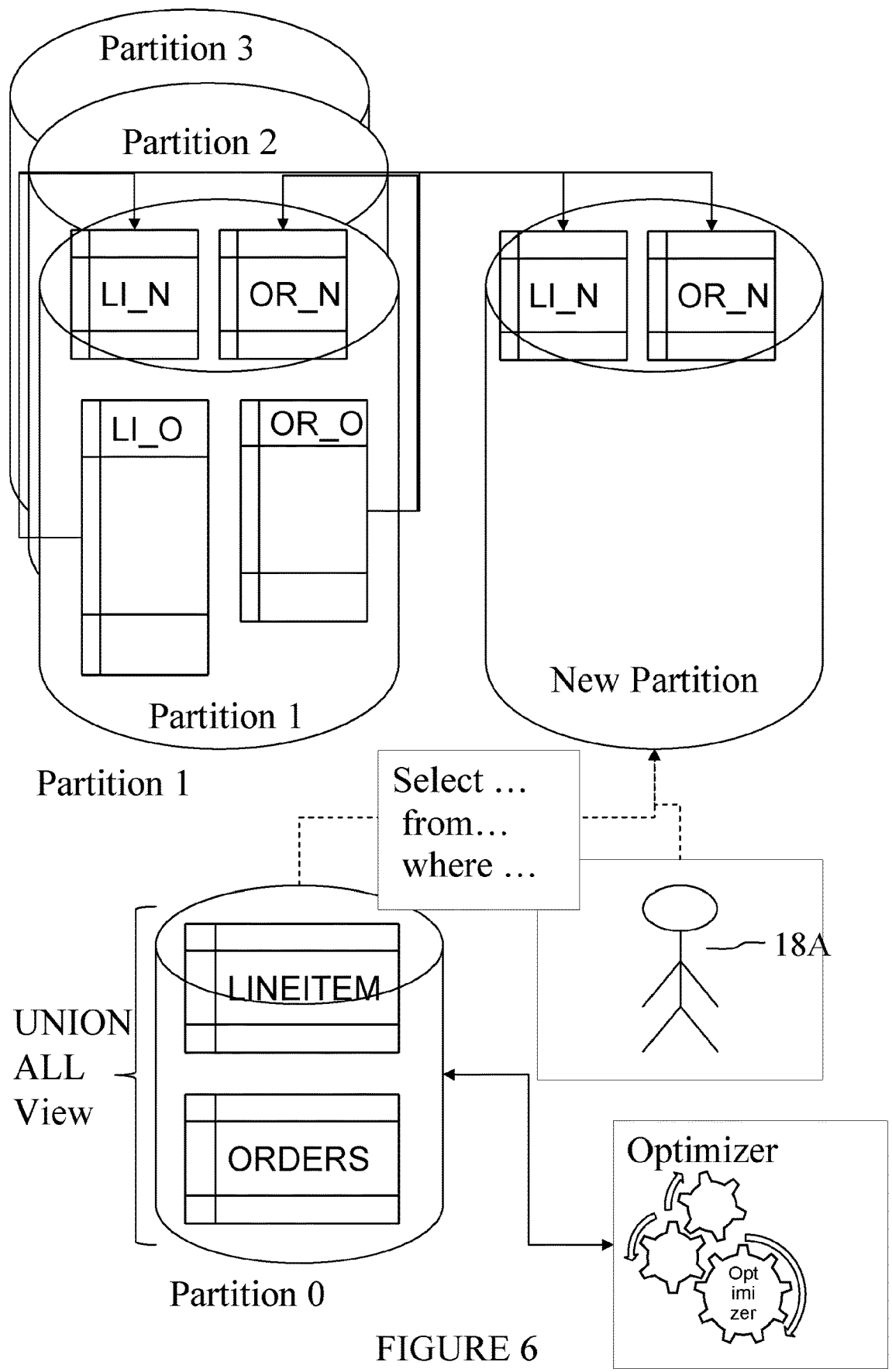
FIG. 6 is an example distribution of collocated tables being redistributed from original partitions to a new partition whilst a simultaneous UNION ALL view is maintained for all partitions.

FIG. 6 illustrates the method for redistribution of the LINEITEM and ORDERS example with original partitions 1, 2, and 3 and new partition 4. Per the diagram, collocated joins are achieved through the UNION ALL views which are what is presented to the end user. LI_O and OR_O tables are the original LINEITEM and original ORDERS tables on existing database partition 1. LI_N and OR_N tables are the equivalent new tables partitioned across all partitions in the expanded database. The check constraints on each table allow the optimizer to direct end user 18A's SELECT statement to the appropriate underlying table. Parallel redistribution is achieved by simply updating the INFLIGHT indicator column to NULL which causes row moment from the original to new tables.

Figure 7:
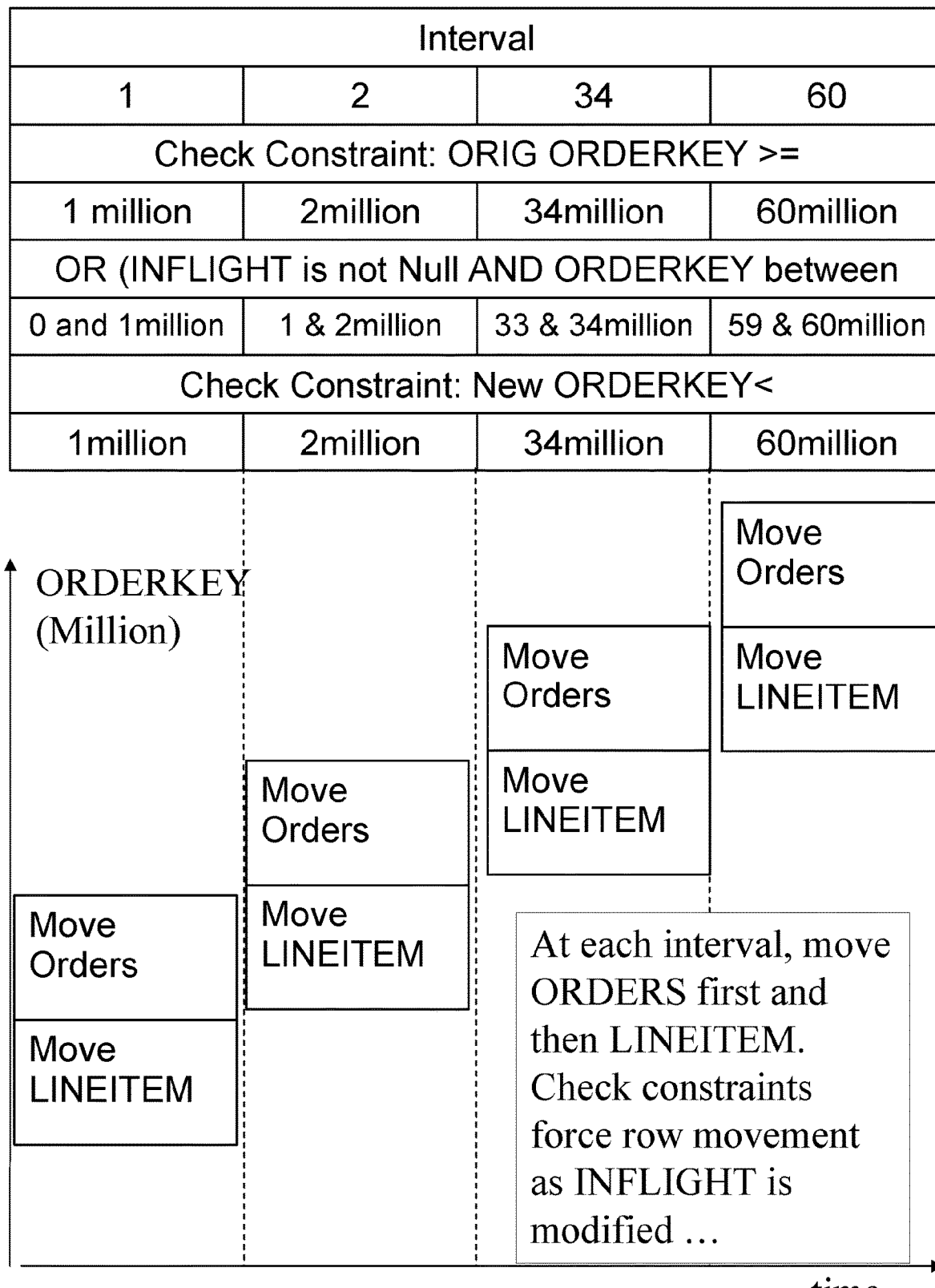
FIG. 7 shows a table of distribution key interval for the preferred embodiment.

FIG. 7 summarizes the check constraints set on the original and new version of each table for each redistribution interval. Per the timeline, the ORDERS table is the parent/dimension table and is moved first followed by the LINEITEM table, for each interval (of which there is 60 in this example). The actual row movement required to redistribute the data from the original to the new tables, is effected simply by updating the value of the INFLIGHT column to NULL. This update causes the check constraint on the Original table to be violated which causes the row to be relocated to the new table, courtesy of WITH ROW MOVEMENT clause of the UNION ALL view. The updates are performed incrementally in small batches & commits, in order to minimize the resource usage profile of the redistribute operation, thereby making the redistribute operation a low impact background process. Meanwhile, any data manipulation language operations performed against the UNION ALL views will be directed to the appropriate underlying table based on the check constraints (for example select, update, insert and/or delete). In particular, any insert operations for the interval being moved will be directed to the new table, by virtue of the fact that no value is provided for the indicator column as it is hidden, and this means there is no requirement to perform a second pass of the original table for any data inserted during the redistribute of that interval. When all rows in the interval have been moved, the check constraints are adjusted to reflect the starting position of the next interval and the process is repeated until all intervals have been processed. The actual adjustment of the check constraints requires only a momentary exclusive lock on each table, in order to drain any data manipulation operations currently in progress to maintain optimizer plan consistency. As the DBMS is controlling the process the check constraints can be altered without the need to check the data conforms to the new constraint.

FIGS. 8A and 8B compare two types of interval distribution for the preferred embodiment and an alternative embodiment respectively.

FIG. 8A shows an even progression of the distribution key range corresponding to the interval number. It can be seen that the corresponding data transfer rate in varies between 3.7 million and 0 cause uneven work flow.

FIG. 8B show another embodiment where the commit size is dynamically tuned and/or throttled using the inbuilt workload management capability of the DBMS. Here the data rate is more even at 2 million whereas the distribution key intervals varies from 0.5 million to 9.8 million to 30.3 million keeping the work flow more even.

Figure 9A:
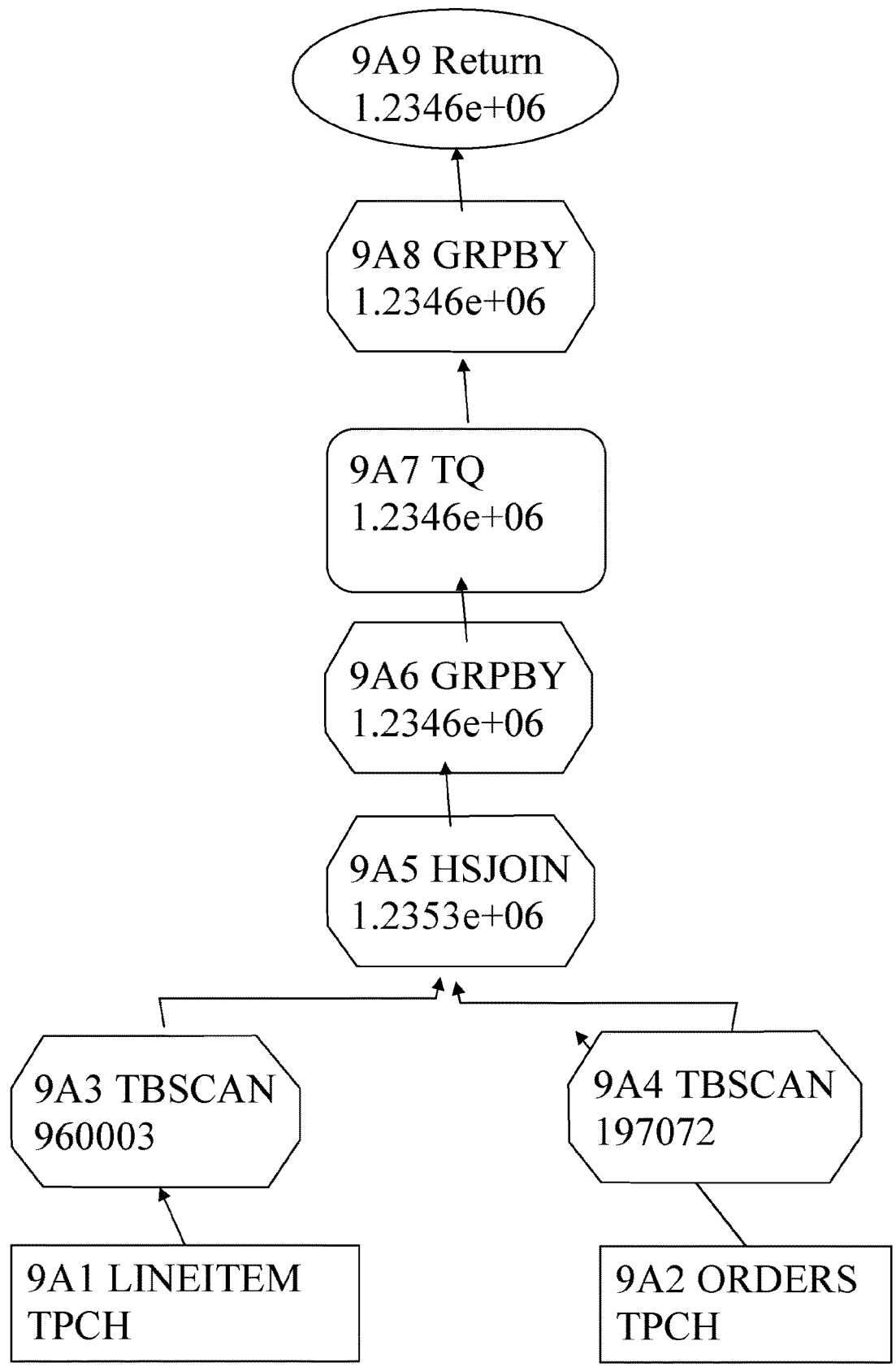
FIGS. 9A, 9B and 9C show example execution plan graph of a simple SELECT query over the original tables during the redistribute operation.

FIG. 9A shows the execution plan graph of a simple SELECT query over the original tables (9A1 and 9A2) prior to starting the redistribute operation. SELECT SUM (EXTENDEDPRICE) FROM LINEITEM 1, ORDERS o WHERE 1.ORDERKEY=o.ORDERKEY AND o.ORDERSTATUS='P'

The graph is a bottom up view of the SELECT query execution. At the bottom of the graph are tables 9A1 and 9A2 in rectangles and above these are the various operators required to process the results obtained from the tables into the result set returned to the end-user at the top of the graph. As can be seen from the graph the LINEITEM and ORDERS tables are joined using a hash join (9A5—an efficient operation for large scale data warehouse queries). Importantly, the join is collocated and there is no table queue (TQ) operation (the operator responsible for transmitting data between partitions over the network interconnect) until after the joins has been accomplished. In other words, the join is collocated.

Figure 9B:
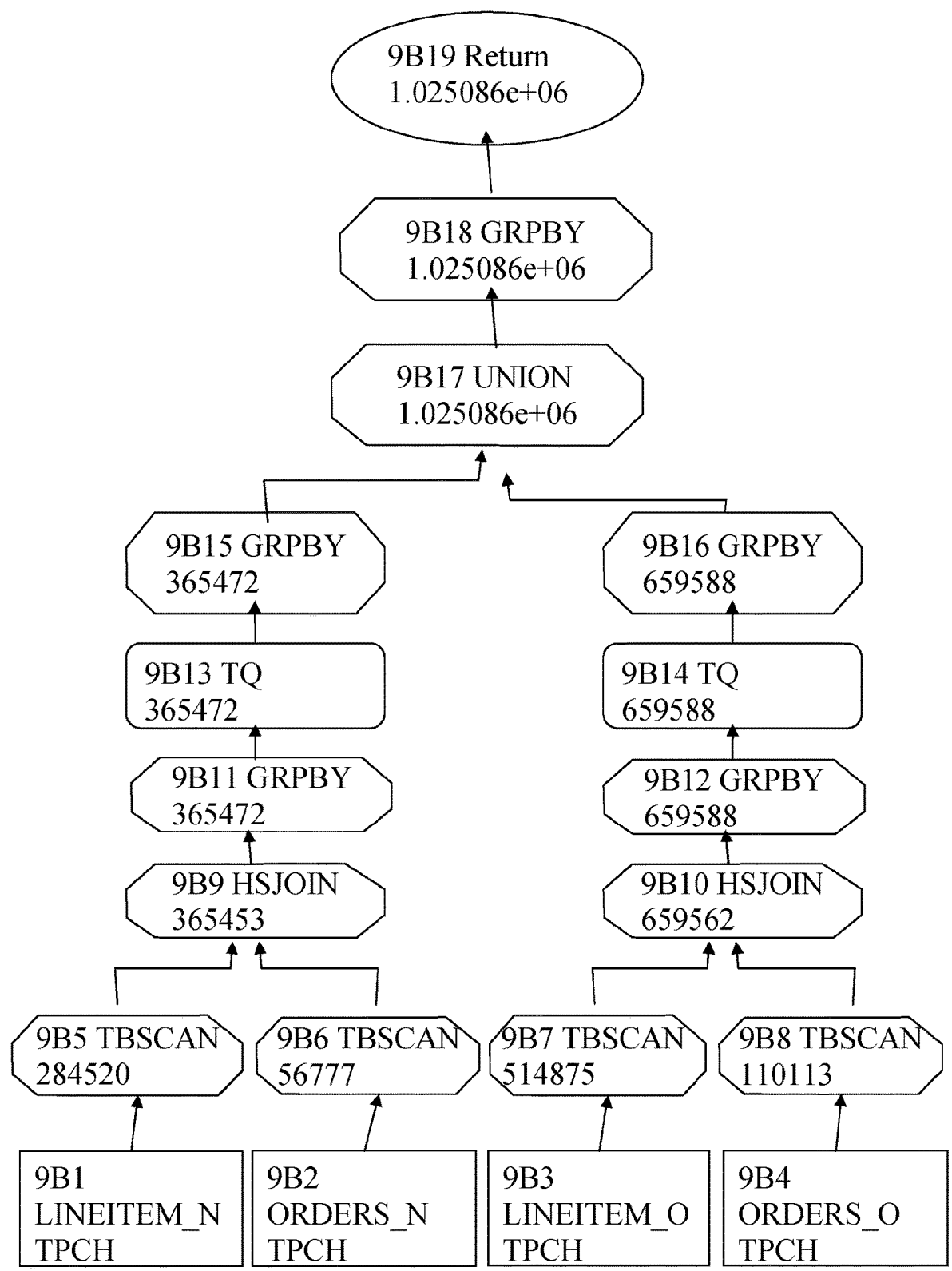

FIG. 9B shows the execution plan for the same query after the 34th redistribute interval. As can be seen from the graph, the execution tree is now split into two main branches. On the left branch the new version of each table (9B1 and 9B2) are processed, while in parallel the original tables (9B3 and 9B4) are processed in the right handside branch. Again table queue (TQ) operators 9B13 and 9B14 do not appear until after the joins 9B9 and 9B10 have been performed, thus clearly showing the joins are collocated. The estimated execution cost (notional concept of unit of resource usage) of the queries is shown at the bottom of each operator shape. As seen, the overall total cost reflects the sum of the costs of the two branches, and the cost on each branch is proportional to the amount of the data which has already been redistributed and the number of partitions the tables is placed over. Consequently, the estimated cost for the left handside branch is less as the new tables are placed over all four database partitions in the expanded database. Importantly, as each branch is processed in parallel the overall execution time is commensurately reduced and the actual execution time is approximately two thirds of that before the redistribute started.

Figure 9C:
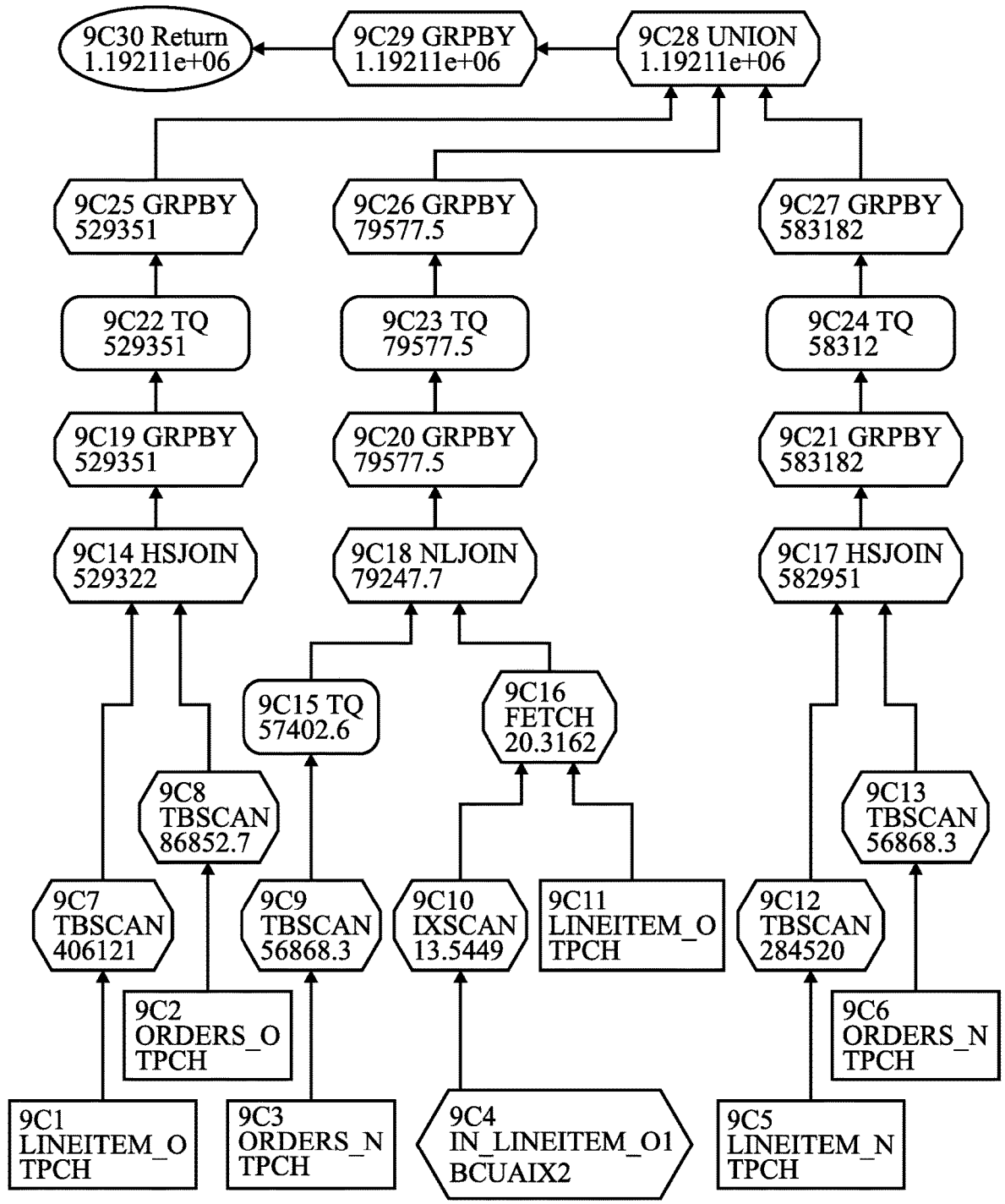

FIG. 9C shows the same query again, this time during the 35th redistribute interval while the data is actually inflight that is being moved. This time there are three sub-branches. On the left, is shown the collocated join over the original tables (9C1 and 9C2) and on the right is the collocated join over the new tables. However, as the data for this redistribute interval is now moving between original and new tables, there is a third branch (center of graph) which performs the join of this data that is actually inflight. Importantly however, the amount of data being joined in this third branch is small, for instance less than one sixtieth of the entire data set, and therefore the optimizer chooses a nest loop join (NLJOIN) operator 9C18 between the tables for this inflight data. The NLJOIN operator is selective and navigates the index on the LINEITEM table rather than a table scan (which is more appropriate in the large scale hash joins per the left and right branches). In this way, the overall impact of the data inflight is marginal and has negligible effect on the overall cost and execution time (the actual duration of the query at this point is still approximately two-thirds that of the original pre-redistribute duration).

The distribution key is typically indexed on each table, which assists performance during the move phases. In the exceptional cases where the distribution key is not already indexed, an index may be automatically created on the tables using an online index create operation, which is dropped again after the redistribute operation has completed.

The number of rows being moved in each interval is a relatively very small portion (typically 1%) of the entire table rows in order to minimize the impact of the inflight data on the execution plan. This is an important aspect of this invention as it maintains user query performance. Indeed, as seen the examples above, the performance of queries will consistently improve over the course of the redistribution as more partitions are contributing to the query retrieval.

The INFLIGHT indicator is used to differentiate rows that are being moved during the current redistribute interval. The overhead of the INFLIGHT conditional predicate (INFLIGHT is not null) is negligible given the relatively few number of rows in the interval.

The check constraints are enforced (for update, insert, and delete DML operations). Normally, altering enforced check constraints involves a scan of the table's data in order to verify the constraint is valid. However, as the DBMS is managing the redistribute data movement, the enforcement of these check constraints can dispense with the data validation scan, thereby making this operation instantaneous.

Long running queries spanning the interval over the table being redistribution can use the Read Stability (RS) isolation level to guarantee there is no inconsistent results due to inflight rows.

A more sophisticated embodiment could allow for defining processing windows for redistribution.

The advantages offered by this invention include:

Collocation is preserved;

Query performance is maintained throughout and very quickly this actually becomes better and better;

Tables are maintained fully available and online for DML queries throughout;

The redistribute operation is fully transaction logged. For example, in the event of a disk media failure redistribute process can seamlessly be restarted from where it left off when the database has been recovered;

No need for double the disk space for inflight tables. An online reorganization operation can be issued after each iteration to reclaim space for the rows deleted from the original table;

No need for special backups before, during or after the redistribute operations. The standard online backup method is compatible with the redistribute process;

Facilitates reliable monitoring of percentage based progress, that is, if split into 100 iterations then can see % throughput;

The redistribute can be paused at any time and can be throttled by reducing insert select batch/commit size and adjusting priority using existing workload management capabilities; and Foreign key constraints are maintained during the redistribute operation as the parent dimension tables are always moved first.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

It will be clear to one skilled in the art that many improvements and modifications can be made to the foregoing exemplary embodiment without departing from the scope of the present invention.

The invention claimed is:

1. A computer-implemented method for redistribution of data in an online shared nothing database, wherein the online shared nothing database comprises original partitions and at least one new partition, the method comprising:
   identifying original tables that are collocated in the original partitions to be redistributed over the original partitions and the at least one new partition, wherein the original tables store data rows storing data, and wherein each of the data rows resides on a partition of the original partitions governed by a distribution key;
   creating new tables in the at least one new partition corresponding to the original tables, wherein the new tables store data rows storing data;
   adding an inflight column with a default value in the original tables and a NULL value in the new tables;
   creating a UNION ALL view of the data from the original tables and the new tables using check constraints, wherein the check constraints are based on the distribution key;
   defining distribution key intervals over a distribution key range for the distribution key; and
   looping through the distribution key intervals by:
      updating the default value of the inflight column to NULL for the original tables based on a current distribution key interval; and
      performing data movement of each of the data rows over the current distribution key interval from the original tables to the new tables based on determining that the check constraints on the original tables are violated using the inflight column, wherein the data is moved from the original tables to the new tables while maintaining collocation; and
   in response to the data movement completing for the distribution key intervals, dropping the inflight column from the original tables and the new tables.

2. The computer-implemented method according to claim 1, wherein the data is relocated between the original tables and the new tables by using a row movement feature of the UNION ALL view.

3. The computer-implemented method according to claim 1, further comprising:
   creating a new partition group spanning the original partitions and the at least one new partition, with an associated new partition map wherein individual partitions are defined as one of a sender and a receiver of the data being moved by:
      extracting a data definition of an existing partition group;
      modifying the data definition to incorporate the at least one new partition; and
      executing the modified data definition.

4. The computer-implemented method according to claim 3, wherein two or more sets of collocated tables are located on two or more partitions within the existing partition group.

5. The computer-implemented method according to claim 1, wherein each of the distribution key intervals is small relative to an entire original table of the original tables.

6. The computer-implemented method according to claim 1, wherein each of the data rows is moved from the original tables to the new tables incrementally and committed in batches.

7. The computer-implemented method according to claim 1, wherein new rows inserted for the current distribution key interval are diverted to a new table of the new tables.

8. A computer program product for redistribution of data in an online shared nothing database, wherein the online shared nothing database comprises original partitions and at least one new partition, the computer program product comprising a non-transitory computer readable storage medium having computer-readable program code embodied therewith, the computer-readable program code executable by at least one processor to perform:
   identifying original tables that are collocated in the original partitions to be redistributed over the original partitions and the at least one new partition, wherein the original tables store data rows storing data, and wherein each of the data rows resides on a partition of the original partitions governed by a distribution key;
   creating new tables in the at least one new partition corresponding to the original tables, wherein the new tables store data rows storing data;
   adding an inflight column with a default value in the original tables and a NULL value in the new tables;
   creating a UNION ALL view of the data from the original tables and the new tables using check constraints, wherein the check constraints are based on the distribution key;
   defining distribution key intervals over a distribution key range for the distribution key; and
   looping through the distribution key intervals by:
      updating the default value of the inflight column to NULL for the original tables based on a current distribution key interval; and
      performing data movement of each of the data rows over the current distribution key interval from the original tables to the new tables based on determining that the check constraints on the original tables are violated using the inflight column, wherein the data is moved from the original tables to the new tables while maintaining collocation; and
   in response to the data movement completing for the distribution key intervals, dropping the inflight column from the original tables and the new tables.

9. The computer program product according to claim 8, wherein the data is relocated between the original tables and the new tables by using a row movement feature of the UNION ALL view.

10. The computer program product according to claim 8, wherein the computer-readable program code is executable by the at least one processor to perform:
   creating a new partition group spanning the original partitions and the at least one new partition, with an associated new partition map wherein individual partitions are defined as one of a sender and a receiver of the data being moved by:
      extracting a data definition of an existing partition group;
      modifying the data definition to incorporate the at least one new partition; and
      executing the modified data definition.

11. The computer program product according to claim 10, wherein two or more sets of collocated tables are located on two or more partitions within the existing partition group.

12. The computer program product according to claim 8, wherein each of the distribution key intervals is small relative to an entire original table of the original tables.

13. The computer program product according to claim 8, wherein each of the data rows is moved from the original tables to the new tables incrementally and committed in batches.

14. The computer program product according to claim 8, wherein new rows inserted for the current distribution key interval are diverted to a new table of the new tables.

15. A computer system for redistribution of data in an online shared nothing database, wherein the online shared nothing database comprises original partitions and at least one new partition, the computer system comprising:
one or more processors; and
a tangible medium coupled to the one or more processors, wherein the tangible medium stores computer-readable program code for execution by at least one of the one or more processors, to perform:
identifying original tables that are collocated in the original partitions to be redistributed over the original partitions and the at least one new partition, wherein the original tables store data rows storing data, and wherein each of the data rows resides on a partition of the original partitions governed by a distribution key;
creating new tables in the at least one new partition corresponding to the original tables, wherein the new tables store data rows storing data;
adding an inflight column with a default value in the original tables and a NULL value in the new tables;
creating a UNION ALL view of the data from the original tables and the new tables using check constraints, wherein the check constraints are based on the distribution key;
defining distribution key intervals over a distribution key range for the distribution key; and
looping through the distribution key intervals by:
updating the default value of the inflight column to NULL for the original tables based on a current distribution key interval; and
performing data movement of each of the data rows over the current distribution key interval from the original tables to the new tables based on determining that the check constraints on the original tables are violated using the inflight column, wherein the data is moved from the original tables to the new tables while maintaining collocation; and
in response to the data movement completing for the distribution key intervals, dropping the inflight column from the original tables and the new tables.

16. The computer system according to claim 15, wherein the data is relocated between the original tables and the new tables by using a row movement feature of the UNION ALL view.

17. The computer system according to claim 15, wherein the tangible medium stores the computer-readable program code for execution by the at least one of the one or more processors, to perform:
creating a new partition group spanning the original partitions and the at least one new partition, with an associated new partition map wherein individual partitions are defined as one of a sender and a receiver of the data being moved by:
extracting a data definition of an existing partition group;
modifying the data definition to incorporate the at least one new partition; and
executing the modified data definition.

18. The computer system according to claim 17, wherein two or more sets of collocated tables are located on two or more partitions within the existing partition group.

19. The computer system according to claim 15, wherein each of the distribution key intervals is small relative to an entire original table of the original tables.

20. The computer system according to claim 15, wherein each of the data rows is moved from the original tables to the new tables incrementally and committed in batches.

21. The computer system according to claim 15, wherein new rows inserted for the current distribution key interval are diverted to a new table of the new tables.

* * * * *